S. WARD.
Back-Band Hook and Buckle.
No. 226,135. Patented Mar. 30, 1880.
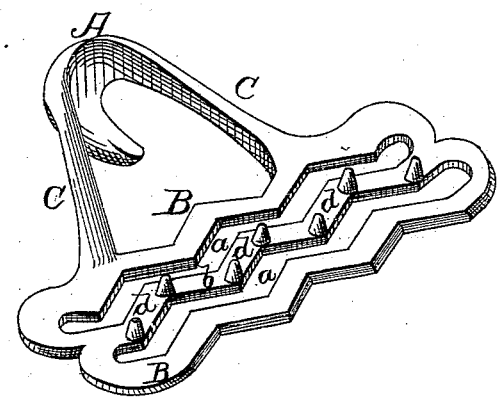
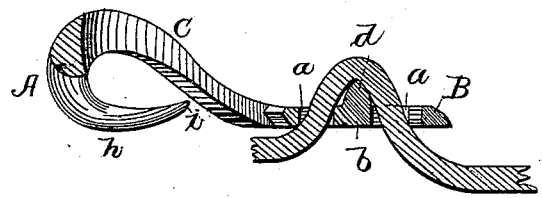
WITNESSES
H. Aubrey Toulmin.
J. McCarthy.
INVENTOR
Seth Ward.
Alexander Mason
ATTORNEYS

UNITED STATES PATENT OFFICE.

SETH WARD, OF PRINCETON, INDIANA.

BACK-BAND HOOK AND BUCKLE.

SPECIFICATION forming part of Letters Patent No. 226,135, dated March 30, 1880.

Application filed August 25, 1879.

*To all whom it may concern:*

Be it known that I, SETH WARD, of Princeton, in the county of Gibson, and in the State of Indiana, have invented certain new and useful Improvements in Back-Band Hooks and Buckles; and I do hereby declare that the following is a full, clear, and exact description thereof, reference being had to the accompanying drawings, and to the letters of reference marked thereon, making a part of this specification.

The nature of my invention consists in the construction of a back-band hook for harness, as will be hereinafter more fully set forth.

In the annexed drawings, Figure 1 is a perspective view of my back-band hook. Fig. 2 is a central section of the same.

My improved back-band hook is intended more especially for cloth or web back-bands, but may be used for leather with very slight modification.

The hook A is made of iron or any suitable metal, and has a buckle-head, B, which is flat, with two irregular slots, *a a*, running crosswise, of sufficient openings to admit the cloth or webbing, leaving a center bar, *b*, between the two slots, and to this center bar are attached teeth *d*, projecting outward. The slots should conform in shape one to the other for the most satisfactory results, but may be varied slightly, if so desired, without great detriment to the buckle.

It will be noticed that the center bar, *b*, corresponds in shape to the slots *a*, and hence is irregular in form, and the teeth *d*, therefore, are arranged, so to speak, eccentrically on said bar.

By combining the irregular slots and the projecting teeth it makes a very secure fastening and the strain on the buckle is equalized, giving a more uniform strain on the cloth or webbing than buckles now generally in use, and consequently less wear on the goods.

The stem of the hook A, connecting the same with the buckle-head B, is made in two parts, C C. When these two parts leave the head they are gradually elevated, rising at an angle of forty degrees (more or less) until a sufficient elevation is reached, at which point the two are combined and turned under, forming the hook proper, A, the knuckle of which is made to come on a plane with the under side of the head, as shown at *h*, and the point *i* of the hook is curved under until it reaches a line with the stem on each side, leaving sufficient room in the turn of the hook for the trace-chain to work easily when once hooked to it. This can be done by bending the chain and hooking in the link, and when the chain is straightened out, which is the case while in use, it will not become unhooked on account of its striking against the point of the hook and the stem on each side, and is not dependent on the back-band to act as a keeper.

Having thus fully described my invention, what I claim as new, and desire to secure by Letters Patent, is—

As an improved article of manufacture, the within-described back-band hook and buckle, consisting of the hook A, having two diverging stems, C C, inclined downward, and the knuckle and point of hook arranged as described, and the buckle-head B, formed with the two irregular slots *a* and a series of projecting teeth, *d*, eccentrically arranged on the center bar between the two slots, substantially as and for the purposes herein set forth.

In testimony that I claim the foregoing I have hereunto set my hand this 16th day of August, 1879.

SETH WARD.

Witnesses:
W. M. LAND,
L. W. GUDGEL.